United States Patent [19]
Oelschlaeger

[11] 3,730,280
[45] May 1, 1973

[54] IMPLEMENT FRAME
[75] Inventor: George Frederick Oelschlaeger, Rock Island, Ill.
[73] Assignee: Deere & Company, Moline, Ill.
[22] Filed: Oct. 30, 1970
[21] Appl. No.: 85,585

[52] U.S. Cl. .................172/581, 172/594, 172/595
[51] Int. Cl. ............................................A01b 21/08
[58] Field of Search....................172/581, 588, 594, 172/595, 568, 668

[56] References Cited
UNITED STATES PATENTS 2,787,105  4/1957  Witner..........................172/595 X
2,727,453  12/1955  Altgelt et al.........................172/581
3,193,023  7/1965  Adee................................172/594 X Primary Examiner—Robert E. Pulfrey
Assistant Examiner—Stephen C. Pellegrino
Attorney—H. Vincent Harsha, Harold M. Knoth, William A. Murray, John M. Nolan and Raymond L. Hollister

[57] ABSTRACT

An implement frame having a plurality of individual tool gang subframes pivotally mounted medially on a main frame for horizontal swinging movement between an angled position for normal operational purposes, and a generally fore-and-aft position for transport purposes.

4 Claims, 3 Drawing Figures

INVENTOR
GEORGE F. OELSCHLAEGER

INVENTOR
GEORGE F. OELSCHLAEGER

Patented May 1, 1973

INVENTOR
GEORGE F. OELSCHLAEGER

3,730,280

IMPLEMENT FRAME

BACKGROUND OF THE INVENTION

The present invention relates generally to an implement frame for supporting a plurality of ground-working tools, and more particularly to a frame having a plurality of tool gangs swingably mounted thereon for movement between a wide operating position and a narrow transport position.

A substantial current trend in the farm equipment field is toward larger and wider implements capable of working a strip of maximum width on each pass through a field. A significant problem is encountered in the design of such implements, however, since although their maximum working width is limited solely by the ability of the towing vehicle to pull them through the ground, their maximum transport width is limited by the width of existing roadways, gateways, etc. An implement having a working width in excess of the latter limitations must therefore include means by which the working width can be narrowed for transport purposes. One solution, illustrated in U.S. Pat. No. 3,118,507 to Oehler et al, is to mount one or more outrigger subframes on either side of a main frame for folding movement to a transport position directly above the main frame. An alternate approach, illustrated in U. S. Pat. No. 3,014,540 to Youngberg, is to mount such outrigger subframes for movement about vertical axes to transport positions either forwardly or rearwardly of the main frame.

Since the outrigger subframes are of necessity quite heavy, the former approach requires an additional apparatus to automatically raise the subframes or, alternatively, to assist their manual raising, thus significantly increasing the cost of the machine. In addition, safety considerations restrict the length and width of those subframes that can be swung to a position over the main frame, due to the higher center of gravity of the machine and its resulting tendency to tip over in transport. A further problem, common to both designs, is that of maintaining the subframes rigidly in their operating positions. Some type of position lock mechanism must be provided for this purpose, again adding to the cost of the implement.

SUMMARY OF THE INVENTION

It is, accordingly, the primary object of the present invention to provide an improved implement frame of the type convertible between a wide operating position and a narrow transport position, and more particularly such a frame characterized by its low center of gravity and resulting stability in the transport position, its ease of conversion between positions, and its economy of manufacture. It is a further object to provide such a frame having a plurality of ground-working tool gangs, and means mounting the gangs for adjustment of their operating angle, wherein said mounting means serves also as means for adjusting the gangs between their operating and transport positions. More particularly, it is an object to provide such a frame wherein a common, removable pin is utilized to maintain the inner end of each tool gang in its operating position and also as a pivot pin supporting the medial portion of the gang on the frame for swinging movement of the gang to its transport position. It is yet a further object to provide such a frame in which the same pin is used also to retain the inner end of the gang in its transport position.

In pursuance of these and other objects, the invention comprises, essentially, a generally rectangular, ground wheel-supported frame having a central fore-and-aft extending member terminating at its forward end in hitch means for attachment to a draft vehicle. A gang of ground-working tools are medially supported at each of the corners of the frame for horizontal pivotal and sliding movement, the gangs being normally disposed at an angle to a line transverse to the frame. The inner ends of the gangs are releasably connected to the central frame member for fore-and-aft adjustment, whereby the normal operating angle of the gangs can be varied as desired. On release of the latter connection, each gang is swingable about its medial support on the frame to a generally fore-and-aft transport position, thereby permitting a substantial reduction in the width of the implement.

BRIEF DESCRIPTION OF THE DRAWINGS

The preferred embodiment of the invention will be described in conjunction with the drawings in which.

DESCRIPTION OF THE PREFERRED EMBODIMENT

Figure 1:
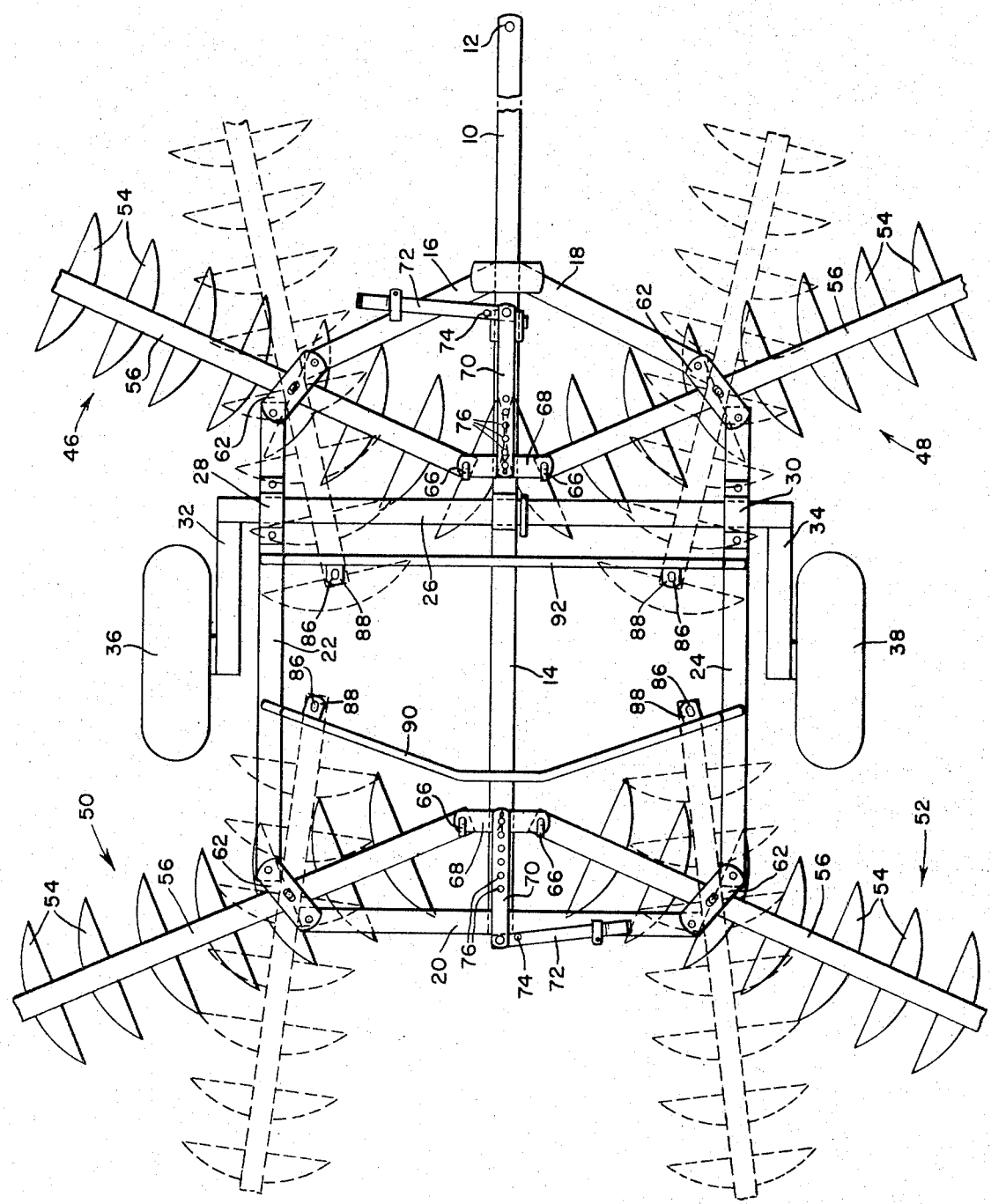
FIG. 1 is the plan view of the implement frame showing both the operating and transport positions thereof.

Referring to FIG. 1 of the drawings, the invention includes a generally rectangular main frame having a central draft member 10 extending forwardly therefrom with a hitch device 12 on its forward end adapted for attachment to the drawbar of a conventional agricultural tractor. The main frame comprises a fore-and-aft center member of portion 14, the member 14 having a pair of left and right, rearwardly diverging members 16 and 18, respectively, welded or otherwise rigidly fixed to its forward end, and a transverse member 20 similarly fixed centrally to its rearward end. A pair of fore-and-aft extending, left and right members 22 and 24 interconnect the outer ends of the member 20 with the outer ends of the members 16 and 18, respectively.

Figure 2:
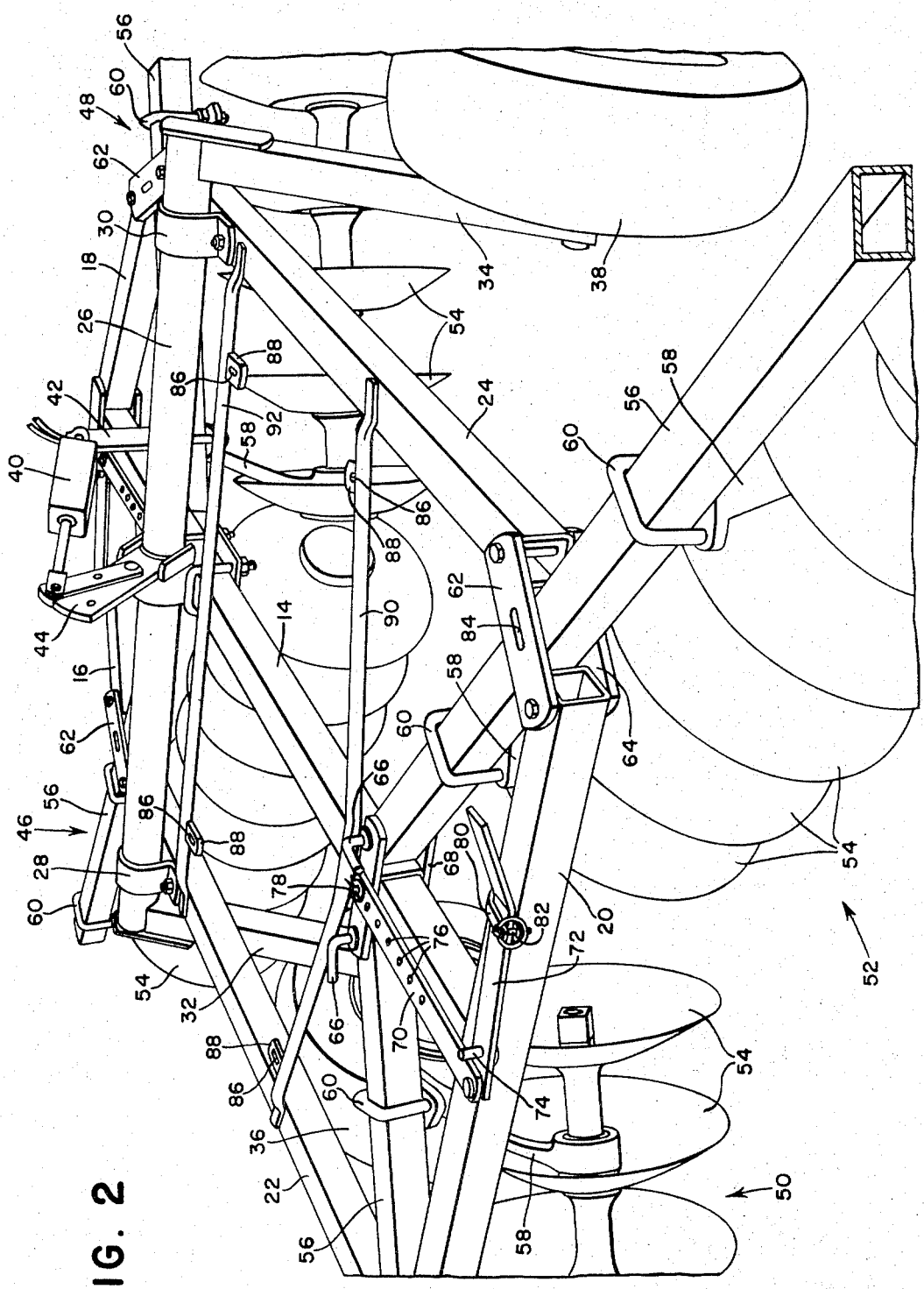
FIG. 2 is a fragmentary perspective view taken from the right rear of the frame and showing one of the gangs in its operating position.
Figure 3:
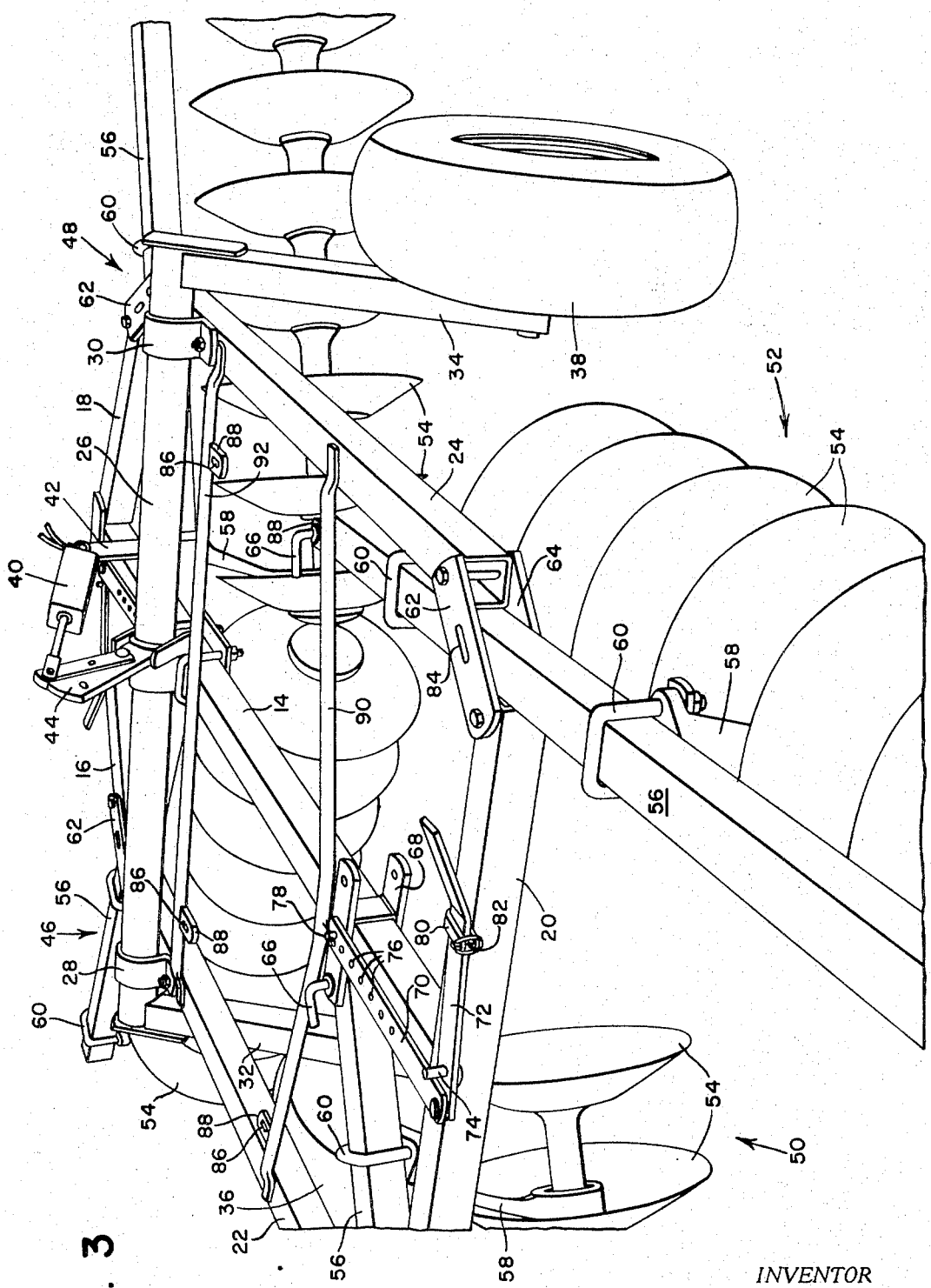
FIG. 3 is a view similar to FIG. 2 showing the gang in its transport position.

A transverse rockshaft 26 is rotatably supported above the members 22 and 24 by a pair of inverted U-shaped brackets 28 and 30, respectively. The opposite ends of the shaft 26 extend outwardly of the members 22 and 24 and have a pair of downwardly and rearwardly extending arms 32 and 34 fixed thereto, the arms rotatably carrying a pair of ground-engaging wheels 36 and 38, respectively, on their outer ends. A hydraulic cylinder 40, extending between a bracket 42 on the center frame member 14 and an arm 44 fixed to the center of the rockshaft 26, is extensible and retractable in response to flow from a conventional hydraulic fluid supply system on the tractor to rotate the shaft 26 and thereby raise and lower the frame. vC5 gang A pair of left and right front gang frames 46 and 48, and left and right rear gang frames 50 and 52, are medially supported on the respective corners of the main frame, each of the frames including a gang or plurality of ground-engaging tools such as disks 54. The construction of the several gang frames, and the manner in which each is supported on the main frame, are both substantially identical, and the ensuing description of the right rear frame 52, shown in detail in FIGS. 2 and 3, is therefore analogously applicable to the frames 46, 48 and 50 as well, and the various reference numerals are applied in the drawings to the analogous elements in the remaining portions of the frame. As illustrated, the gang frame 52 comprises an elongated frame member 56 supporting a gang of disks 54 thereunder on a plurality of vertical standards 58 held to the undersides of the member 56 with U-bolts 60. The middle portion of the member 56 is pivotally and slidably received in an opening formed by a pair of upper and lower plates 62 and 64, respectively, rigidly interconnecting the adjacent ends of the frame members 20 and 24, the plates 62 and 64 serving as a support for the middle portion of the member 56. The inner end of the member 56 is pivoted on a pin 66 between a pair of upper and lower plates projecting outwardly from and forming the upper and lower sides of a box-like structure or support 68, the structure or support 68 being slidable fore-and-aft on the center frame member 14 for adjusting the working angle of the gang 52. The left rear gang frame 50, as shown in FIGS. 2 and 3, is similarly pivoted on the opposite side of the structure 68. As previously noted, sufficient clearance is provided between the plates 62 and 64 to permit the frame 56 to pivot in the opening formed by the plates and the members 20 and 24, and to move axially therethrough as the angle of the gang is changed.

A mechanism for facilitating the manual adjustment of the rear pair of gangs 50 and 52 is provided in the form of a link 70 interconnecting the structure 68 with an angling lever 72 pivoted on the rear frame member 20 and 74. A similar mechanism is provided on the front of the frame for adjusting the front pair of gangs 46 and 48. The link 70 of the mechanism is provided with a plurality of equally-spaced holes 76 for receiving a pin 78 fixed to the upper surface of the structure 68. Since the pivot 74 is located close to the inner end of the lever 72, the force exerted on the outer end of the lever is greatly increased when transmitted to the structure 68, while the distance moved is correspondingly decreased. Each hole setting in the link 70 is operative to move the structure 68 through only a limited distance, and successive settings must be used to move the structure through its full range of adjustment. The rear gangs 50 and 52 are shown in FIG. 2 in their fully-angled position, with the structure 68 at its forward extreme of travel. For normal operational purposes, the outer end of the lever 72 is held in a U-shaped bracket 80 to the upper surface of the frame member 20. A removable pin 82 retains the arm within the bracket 80.

The gang frame 52 is converted from its normal operating position, shown in FIG. 2, to its transport position, shown in FIG. 3, in the following manner. The structure 68 is first moved to its forwardmost position of FIG. 2, thereby adjusting the gang frame to its maximum working angle. The pin 66 connecting the inner end of the gang frame member 56 to the structure 68 is then removed and inserted through a pair of aligned slots 84 in the upper and lower plates 62 and 64 (only one being shown) and a further pair of aligned slots (not shown) in the upper and lower walls of the member 56. The slots in the member 56 are so located as to be aligned with the slots 84 in the plates 62 and 64 when the gang 52 is fully angled. The gang frame is next manually swung about the pin 66 to its generally fore-and-aft transport position of FIG. 3, whereupon the pin 66 is removed from the slotted holes and reinserted as shown in FIG. 3 through a slot 86 in a bracket or connection member 88 located just inwardly of the side frame member 24, the slot 86 being vertically aligned with the pin-receiving hole in the inner end of the member 56. The pin 66 thus serves to maintain the gang frame 52 in its transport position. A pair of brackets or connection member 88, for receiving the inner ends of the rear gang frames 50 and 52, are fixed to the leading edge of a transversely extending curved tube 90 which, in turn, is welded to the upper surfaces of the members 14, 20, and 24. A straight tube 92, extending transversely across the main frame just rearwardly of the rockshaft 26, supports an identical pair of brackets or connection member 88 for receiving the inner ends of the front gang frames 46 and 48. As is apparent from FIG. 1, each of the brackets or connection member 88 is generally in longitudinal alignment with the adjacent corner of the main frame, such that the gang frames are generally longitudinally disposed in their transport positions. When all four of the gang frames, 46, 48, 50 and 52, are converted to their transport positions, the implement has the configuration shown in dashed lines in FIG. 1. The gang frames can be reconverted to their operating positions, shown in solid lines in FIG. 1, by merely reversing the foregoing steps.

I claim:

1. An implement comprising: a main frame including a longitudinally extending center frame member; an elongated, tool gang supporting frame member with inner end and medial portions, said portions having first and second pin-receiving apertures, respectively, first support means mounted on said center frame member and slidable thereon between a plurality of longitudinally spaced positions of adjustment, said first support means having a third pin-receiving aperture therein; a pin releasably receivable by said first and third pin-receiving apertures to pivotally connect said gang frame member to said first support means; second support means on said main frame and laterally spaced from said first support means for swingably and slidably supporting the medial portion of said gang frame member, whereby the angle of said gang frame member relative to said main frame is adjustable in response to longitudinal adjustment of said first support means; said second support means having a fourth pin-receiving aperture therein disposed in vertical alignment with said second pin-receiving aperture in said gang frame member when said first support means is disposed in one of its positions of adjustment, said second and fourth apertures when so aligned being adapted to removably receive a pin to form a pivotal connection between said second support means and said gang frame member, the latter being swingable about said pivotal connection to a generally longitudinal transport position when the pin received by said first and third aperture is removed; and connection means on said main frame having a fifth pin-receiving aperture therein spaced from the fourth aperture in said second support means a distance substantially equal to that between said fourth aperture and said third aperture in said first support means when the latter is disposed in its said one position of adjustment, whereby said first and fifth apertures are vertically alignable when said gang frame member is swung to its transport position, said first and fifth apertures, when so aligned, being adapted to removably receive said pin to thereby retain said gang frame member in its transport position.

2. The invention defined in claim 1 wherein said one position of adjustment of said first support means corresponds to the maximum angle position of said gang frame member relative to said main frame.

3. The invention defined in claim 1 wherein said second support means comprises structure defining an opening loosely receiving the medial portion of said gnag frame member.

4. The invention defined in claim 1 wherein said pin releasably receivable by the first and third pin-receiving apertures is also releasably receivable by said second and fourth apertures when aligned and by said first and fifth apertures when aligned.

* * * * *